United States Patent [19]

Nakamura et al.

[11] 4,309,101
[45] Jan. 5, 1982

[54] SYSTEM FOR CONTROLLING APPARATUS FOR COMPOSITE-RECORDING INFORMATION

[75] Inventors: Hiroya Nakamura, Kunitachi; Hiromi Taguchi, Hachioji, both of Japan

[73] Assignee: Konishiroku Photo Industry Co., Ltd., Tokyo, Japan

[21] Appl. No.: 59,618

[22] Filed: Jul. 23, 1979

[30] Foreign Application Priority Data

Jul. 26, 1978 [JP] Japan .................................. 53-91287
Aug. 18, 1978 [JP] Japan .................................. 53-100010

[51] Int. Cl.³ ............................................. G03G 15/00
[52] U.S. Cl. .................................. 355/14 R; 355/3 R
[58] Field of Search .............................. 355/3 R, 14 R

[56] References Cited

U.S. PATENT DOCUMENTS

| | | | |
|---|---|---|---|
| 4,027,961 | 6/1977 | Starkweather | 355/3 R |
| 4,099,860 | 7/1978 | Connin | 355/14 |
| 4,166,691 | 9/1979 | Ebi et al. | 355/3 TR X |

*Primary Examiner*—Fred L. Braun
*Attorney, Agent, or Firm*—James E. Nilles

[57] ABSTRACT

An apparatus for composite-recording information, having an optical system for forming an image corresponding to an original placed on a copy board onto a photosensitive member thereby to form an electrostatic latent image of the original, a reproducing device for scanning and reproducing electric information signals on the photosensitive member in the form of an electrostatic latent image, and a developing device for developing the electrostatic latent image on the photosensitive member in a visualized form. A system for controlling the apparatus for composite-recording information is characterized in that when there is a request for recording electric information signals while the electrostatic latent image is being formed on the photosensitive member by use of the optical system, a cycle for forming electrostatic latent image of electric information signals having high priority is executed after one page of electrostatic latent image has been formed.

2 Claims, 6 Drawing Figures

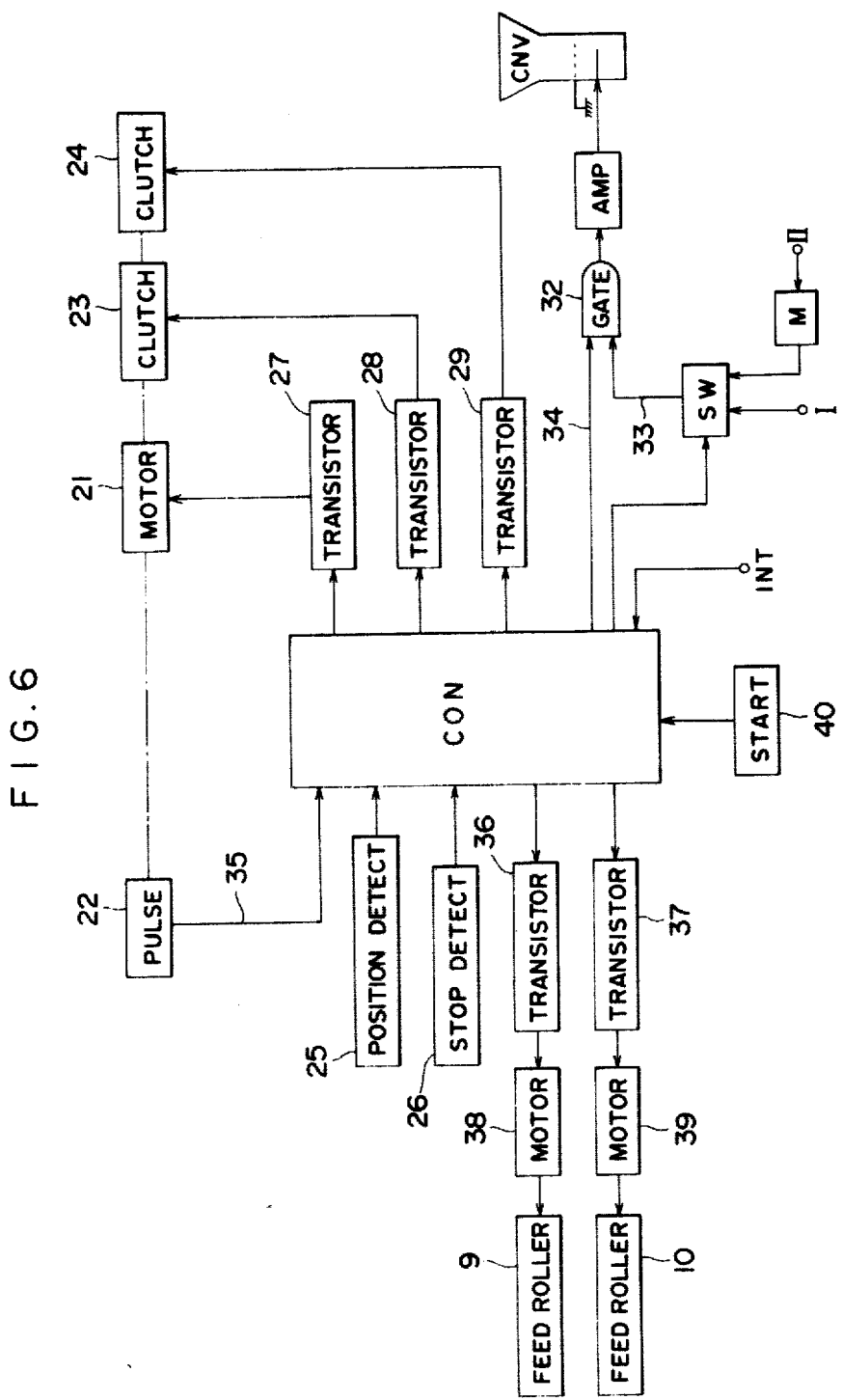

SYSTEM FOR CONTROLLING APPARATUS FOR COMPOSITE-RECORDING INFORMATION

BACKGROUND OF THE INVENTION

The present invention relates to a system for controlling apparatus for composite-recording information. More specifically, the present invention deals with a system for controlling apparatus for composite-recording information, comprising a scanning optical system for forming onto a photosensitive member an electrostatic latent image of an original placed on a copy board, a reproducing means for reproducing electric information signals in the form of an electrostatic latent image onto the photosensitive member, and a recording device for visualizing the electrostatic latent image on the photosensitive member by way of toner developing.

In the field of processing picture information, in general, a variety of copying machines have been used to record the same contents as the originals, and a variety of facsimile printers have beem employed to transfer the contents of originals to distant locations.

In contrast with such recording devices having a single function, there have recently been developed information recording apparatus for attaining a plurality of purposes by taking advantage of the common features of different types of record processings after the latent images have been formed. For example, Japanese Patent Laid-Open No. 63,340/77 discloses "composite apparatus for reproducing image and for forming image" to fulfill the above object. Such a composite apparatus has been equipped with an optical system for forming on a photosensitive member a latent image of an original placed on a copy board and an optical fiber tube for reproducing picture (information) signals introduced from external equipment onto the photosensitive member. Therefore, such an apparatus can be used for a plurality of purposes, for instance, as a copying machine and as an optical printer. Other similar apparatus have been disclosed in Japanese Patent Laid-Open Nos. 87,587/77 and 114,340/77.

SUMMARY OF THE INVENTION

With respect to the abovementioned composite-recording apparatus, and particularly with respect to composite-recording apparatus which can function as a copying machine and can also function for electrically recording information, the primary object of the present invention is to provide a control system which enables the composite-recording to be efficiently carried out and which has an interruption control system whereby electric information signals are temporarily stored while a latent image is continuously formed as contents are being copied from an original or as other electric information signals are being recorded, and after a piece (one page) of information is completely copied from the latent image being formed, the stored electric information signals are allowed to be recorded, and then after that recording is completed, continuous copying is resumed.

With respect to the composite-recording apparatus of the abovementioned interruption control system, another object of the present invention is to provide a control system in which when an interruption is requested while electric information is being continuously made or when contents are being copied from an original, the return of the copy board is omitted to allow the stored electric information signals to be promptly recorded or controlled, in order that the stand-by period for a requested interruption is shortened or the continuously recording period is shortened, so that the period for continuously copying the original is eventually shortened.

Other objects and features of the present invention are mentioned below in conjunction with the accompanying drawings.

BRIEF DESCRIPTION OF THE DRAWINGS

FIG. 6 is a diagram for illustrating detailedly the apparatus shown in FIG. 3.

DESCRIPTION OF THE PREFERRED EMBODIMENT

Figure 1:
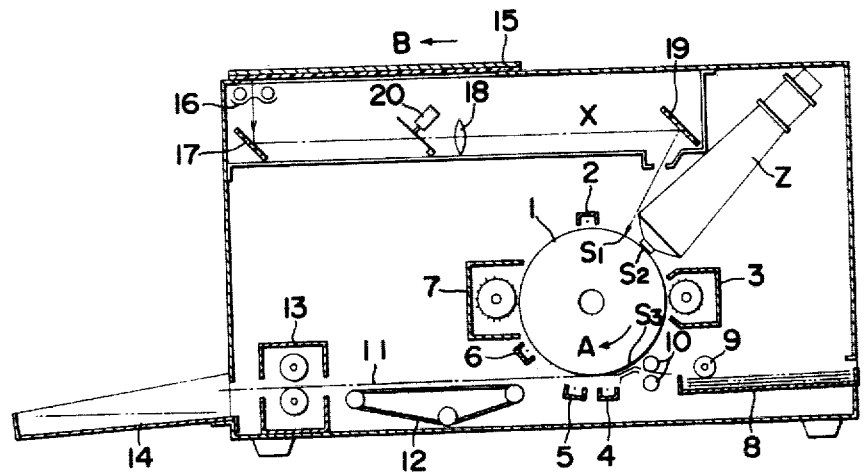
FIG. 1 is a diagram for illustrating the apparatus for composite-recording information.

FIG. 1 shows an apparatus for composite-recording information. Around the periphery of a photosensitive drum 1 made of selenium or zinc oxide are disposed a corona charging electrode 2, a developing device 3, such as a magnetic brush developing device, a transfer electrode 4, a separating electrode 5, a discharging electrode 6, and a cleaning device 7 arranged in the rotating direction of arrow A and in the order mentioned. A recording paper or a copying paper (referred to as a recording paper, hereinafter) 11, supplied from a magazine 8 via a first feed roller 9 and a second feed roller 10, passes through between the photosensitive drum 1 and the transfer electrode 4. Regardless of whether this occurs during copying or a recording operation, a toner image formed on the photosensitive drum is transferred onto the recording paper which then passes through a conveyor device 12 and a heat fixing device 13 whereby the toner image on the recording paper is melted and fixed thereon as per se well known. The transferred paper on which the toner image is visible is taken out through a paper receiving means 14.

On the upper portion of the housing is mounted a copy board 15 which will be moved at a controlled speed in the direction of arrow B in accordance with the copying operation. The copy board 15 is illuminated by a source of light 16 located just beneath it. Between the copy board 15 and the photosensitive drum 1 is provided an exposure optical system X consisting of a first mirror 17, a lens 18 and a second mirror 19. The image of the original carried by the copy board 15 is formed on the circumferential surface of the photosensitive drum 1, between the corona charging electrode 2 and the developing device 3, so that the picture of the original is progressively formed on the photosensitive drum 1 as an electrostatic latent image.

A reproducing device Z having an electric/optical conversion means such as optical fiber tube (OFT) to direct a recording face is provided adjacent to the circumferential surface of the photosensitive drum 1 between the corona charging electrode 2 and the developing device 3. To the input terminals of the reproducing device Z are fed electric information signals or facsimile output signals stored in a memory so as electronic computer or the like, such that the picture possessed by the electric information is scanned and reproduced on the photosensitive drum 1 as an electrostatic latent image. While the reproducing device Z is in operation, the source of light 16 is cut off and the shutter 20 is closed to halt the operation of the optical system X. The operation of reproducing an image on paper from an original present at the apparatus, with the employment of the exposure optical system X, is herein designated "copying;" the operation of producing an image on paper that corresponds to electrical information signals received from a remote location, with the employment of the electric/optic conversion means Z, is herein designated "recording."

Figure 2:
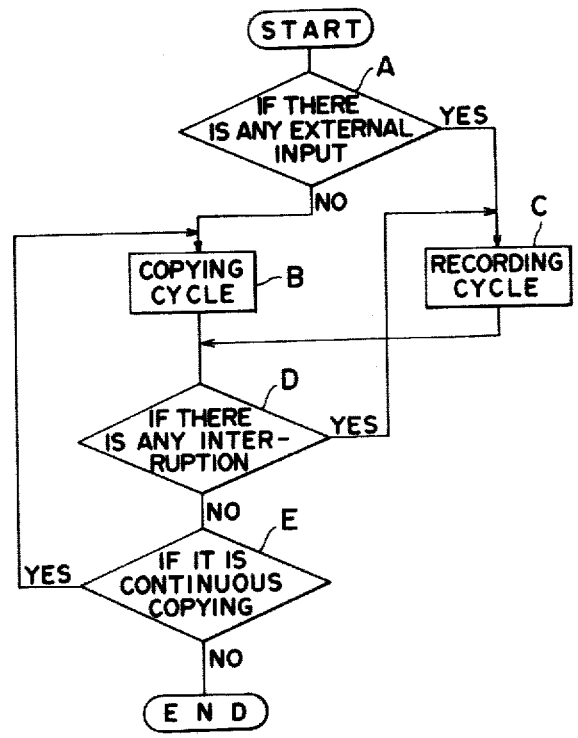
FIG. 2 is a flow chart for illustrating the control system of the present invention.

The control method according to the present invention for use with the abovementioned apparatus for composite-recording information is described below with reference to the flow chart of FIG. 2. That control method accommodates the situation in which the apparatus receives electric information signals either while it is copying an orignal that is present at the apparatus or while it is recording from other electric information signals. Electric information signals from which a recording is being made are herein designated "first electric information signals," and electric information signals which are received while either a copying or a recording operation is in progress are herein referred to as "second electric information signals." Referring to FIG. 2, when a start command is introduced, a discrimination is made at A in regard to whether the command is to copy an original or to record first or second electric information signals. When it is discriminated that the command is to copy an original, the electrostatic latent image of one page of the original is formed on the photosensitive drum according to a copying cycle B, and is further transferred onto the recording paper. When it is discriminated at A that the command is to record electric information signals, the electrostatic latent image of one page of the electric information signals is formed on the photosensitive drum according to a recording cycle C in which the reproducing device Z is used as described hereinbefore, and is further transferred onto the recording paper after the developing process has been done. In each of the copying cycle B and the recording cycle C, after one page of electrostatic latent image has been formed on the photosensitive drum, a discrimination is made at D in regard to whether there is any request (interruption) for recording second electric information signals. If there is any such interruption, the procedure is returned to the recording cycle C to record the second electric information signals. If it is discriminated in D that there is no interruption, it is then discriminated in E whether continued copying should be carried out. If the command is to carry out continued copying, the procedure is returned to the copying cycle B to perform another page of copying operation. The discrimination is carried out again in D. If the command is not to perform continued copying, the operation is stopped.

Thus, when it is requested to record second electric information signals while an original is being copied or while first electric information signals are being recorded, the second electric information signals are recorded upon completion of one page of the copying or the recording being carried out. Thus the second electric information signals can be recorded with a minimum stand-by period, making the system very suited for effecting composite copying together with recording of external information such as facsimile signals for which the stand-by period is desired to be reduced.

Figure 3:
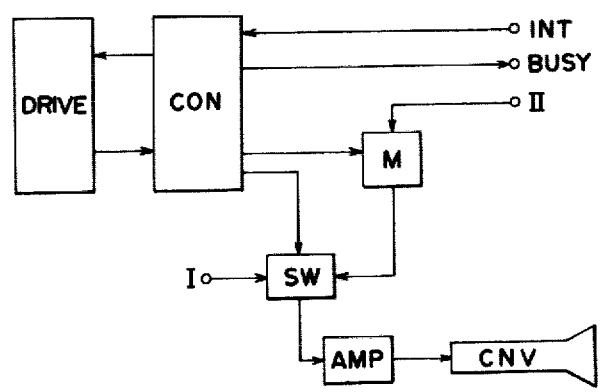
FIG. 3 is a diagram for illustrating the apparatus which executes the control system of the present invention.

FIG. 3 shows an embodiment of the control apparatus for embodying the control system of the present invention. A control circuit CON is made up of a microcomputer. In the case of the microcomputer, the control circuit CON is programmed as diagrammed in FIG. 2. When a request signal INT for recording of external information is introduced during a copying or stand-by period, the control circuit CON operates to prepare for the interruption. If the apparatus is in a stand-by period, the recording cycle can be immediately begun. If the apparatus is performing copying, a BUSY signal will be produced toward the external source of information.

Upon completion of one page of copying or of recording based on a first electric information signal, the BUSY signal is cancelled. After the BUSY signal is cancelled, the second electric information signals II are introduced from the external source of information to the memory M and are stored. The information may take the form of code signals or analog signals like that of facsimile. The memory M may be unnecessary when the external source of information possesses the memory M or when it is allowed to stand-by the information output like a facsimile. When the information is to be received at a slow rate like that of facsimile and is to be recorded by the apparatus of the present invention, the information is first stored at the slow rate in the memory M. After the information of one page is stored, the interruption is put into effect to record the contents stored in the memory M at once, at the recording rate of the apparatus of the present invention, so that the utilization efficiency of the apparatus can further be increased. The information stored in the memory M is sent to a video amplifier AMP via a switch SW controlled by the control circuit CON and is reproduced on the photosensitive member in the form of optical signals by means of an electric/optical converter means CNV such as optical fiber. The switch SW operates to selectively feed to the amplifier AMP either the signals from the memory M or the first electric information signals I. A symbol DRIVE denotes a drive unit of the composite-recording apparatus, which drives various portions (such as copy board) in response to a drive command from the control circuit CON, and which gives a timing signal when in its driving state to the control circuit CON. The external information inclusive of the first electric information need not be limited to two kinds only; when there are three or more kinds of external information, the interruption processing will be carried out depending upon the priority. In the embodiment according to the present invention, the priority order is so arranged that the recording operation takes priority over the copying operation. Further, the recording of facsimile signals takes priority over another recording operation, for example, of output signals of a word-processor. Also, the recording operation based on foreign transmitting signals takes priority over that from a domestic signal source in the facsimile recording operation. It goes without saying that the priority order can be determined in consideration of economization or degrees of urgency and the like.

According to the present invention as mentioned above, when it is requested to record second electric information signals while copying is being effected or first electric information signals are being recorded, the second electric information signals can be recorded with the minimum stand-by period.

Figure 4:
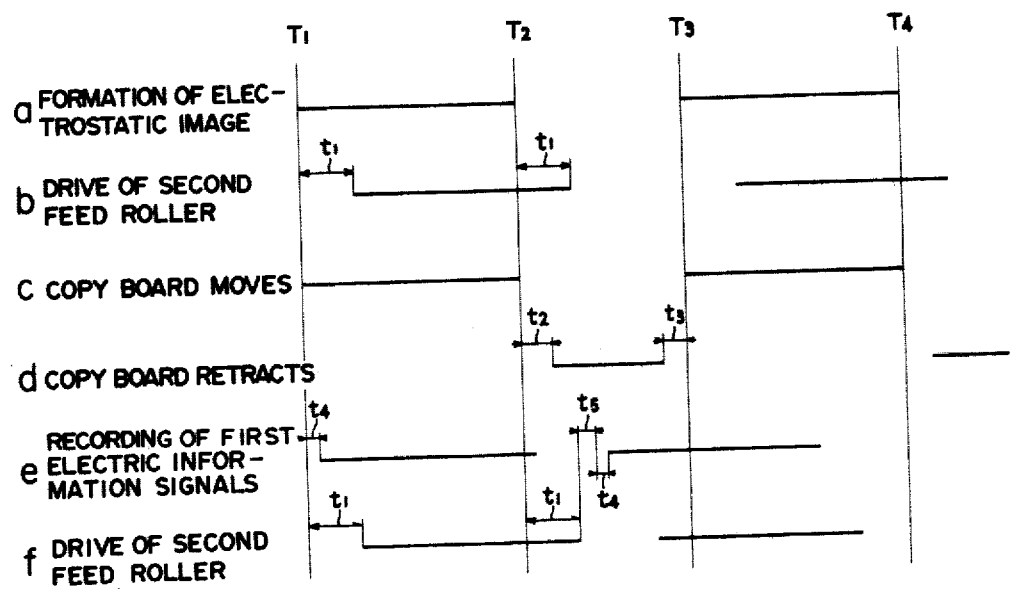
FIG. 4 is a time chart for forming picture according to the control system of the present invention.

FIG. 4 is a time chart for forming the picture according to the control system of the present invention. It will be described in conjunction with FIG. 1. As the copying operation is started at a time $T_1$, the copy board 15 is moved in the forward direction shown by an arrow B in FIG. 1 from a home position as shown in c in FIG. 4, and an electrostatic latent image corresponding to the picture of the original is formed at a point $S_1$ (see FIG. 1) on the photosensitive drum 1 during a period a in FIG. 4. When the electrostatic latent image on the photosensitive drum 1, which is tonerdeveloped by the developing device 3, comes to a point $S_3$ where it comes into surface contact with the recording paper 11, the front edge of the recording paper 11 will already be at the point $S_3$, being controlled by the second feed roller 10. Therefore, the second feed roller 10 is started after a delay internal $t_1$ following the time $T_1$, as shown in b in FIG. 4. After the copy board 15 has been advanced, i.e., when one page of electrostatic latent image of the original is completely formed at a time $T_2$, the operation is changed to the operation for quickly retracting the copy board 15; the operation to retract the copy board 15 is started after a time interval $t_2$ for switching the operation into backward drive has passed, as shown in d in FIG. 4. After the copy board 15 has been retracted to the original position, and after another time interval $t_3$ for switching the backward movement into the next forward movement has passed, the command for starting the next copying operation is produced so that a continued copying operation is started at a time $T_3$ and continues through to a time $T_4$.

On the other hand, when second electric information signals are to be recorded, the light is radiated onto a point $S_2$ on the photosensitive drum 1 after an interval $t_4$ following the time $T_1$, as shown in e in FIG. 4. The time lag $t_4$ is provided in order to correct for the difference in positions as between the point $S_1$ at which the original is irradiated onto the drum and the point $S_2$ at which the electric information signals are recorded, and to attain timing for starting the feed of paper. Therefore, as shown in f in FIG. 4, the feed of paper is started for either copying or recording at the time $T_1$ plus $t_1$.

A continued recording of electric information signals is resumed after an interval $t_5$, following completion of the first recording i.e., after the feed of paper by the second feed roller is finished ($T_2+t_1$) and when the front edge of the recording paper has reached the stopped second feed roller. Therefore, the signal is continuously recorded by skipping the return motion of the copy board.

Figure 5:
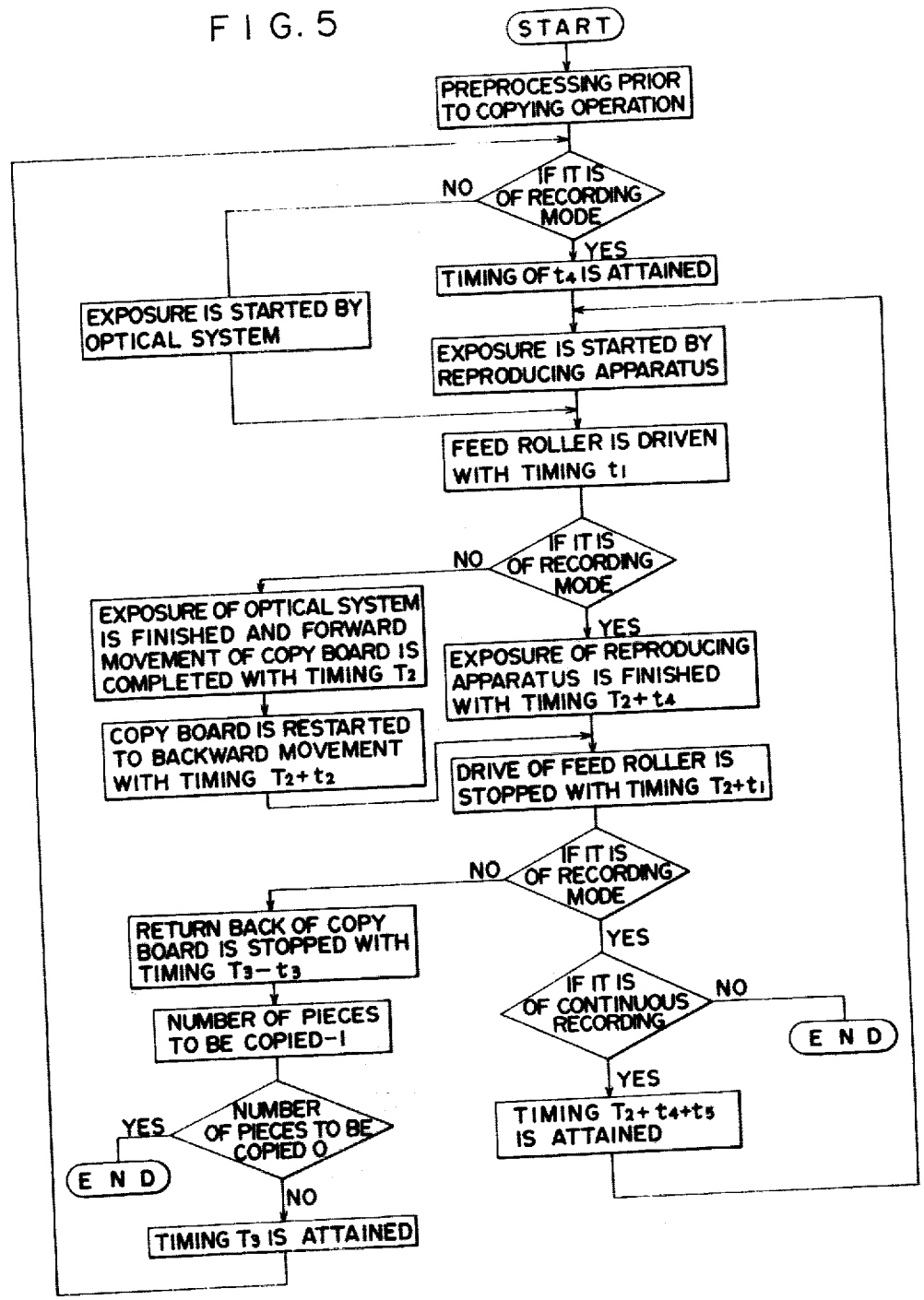
FIG. 5 is a flow chart of the control system.

When it is requested to record second electric information signals while an original is being copied during the period from the time $T_1$ to the time $T_2$, or while the copy board is moved toward the home position (during the time $T_2$ to $T_3$), the second electric information signals are introduced into the recording mode after the one page of electrostatic latent image being copied is formed, or after the copy board has skipped back. In this case, also, the recording operation is controlled by way of the timings shown in e and f in FIG. 4. For example, when the exposure of the original is finished at the time $T_2$, and feed of the paper by the second feed roller is finished at the time $T_2+t_1$, the exposure of electric information is started at a time $T_2+t_1+t_5+t_4$. FIG. 5 is a flow chart showing the abovementioned operations.

FIG. 6 is a diagram for illustrating concretely the apparatus for forming the control sequence of the present invention in comparison with FIG. 3.

It is to be understood that each block in FIG. 6 shows a concrete member as apparent from the following descriptions.

In FIG. 6, reference numeral 21 denotes a motor for driving the photosensitive drum 1 shown in FIG. 1. A dash-and-dot line at the right hand of the motor 21 denotes an output shaft of the motor 21 and a dash-and-dot line at the left side of the motor 21 denotes a drum shaft to which power is transmitted through a suitable driving system from the output shaft of the motor 21. Reference numeral 22 denotes a timing pulse generator mounted on the drum shaft to be rotated in the same direction and with the same angular velocity as the photosensitive drum (not shown).

The timing pulse generator is formed by, for example, a disk having a suitable number of circumferentially spaced slits. These slits are detected by a pair of photoelectric elements (not shown) and an output from the elements is applied as a pulse 35 on the microcomputer CON.

Reference numerals 23 and 24 denote clutches mounted on the motor shaft, which serve for forward movement and backward movement of the copy board, respectively. For this arrangement, a well known conventional technique can be used.

The microcomputer CON counts the pulses 35 and produces outputs for timing and operating processes for the charge, exposure and development, respectively, on command from a copy(print) start button 40. In this embodiment, the control with respect to the copy board is carried out independently as described hereinafter.

The timing of $T_1-T_4$ shown in FIG. 4 is effected by the abovementioned system. In other words, the operations of many processes are stored in the read only memory of the microcomputer as a program comprising the counter value of pulses according to the position of rotation of the photosensitive drum.

Reference numeral 25 denotes means comprising a microswitch, for example, for detecting whether the copy board 15 is at a home position or not. In this embodiment, for precise control, the apparatus is not operated unless the copy board is at the initial position thereof. When the copy board is at the time position and the print (copy) button 40 is depressed, the copy board begins to be moved, through the clutch 23, in the leftward direction in FIG. 1. Reference numeral 26 denotes means for detecting the end of the forward movement of the copy board. Means 26 comprises a microswitch similar to means 25. When means 26 detects the end of forward movement of the copy board, the microcomputer CON, in response to a signal from means 26, causes the clutch 23 for forward movement to assume its OFF state and the clutch 24 for backward movement to assume its ON state, thereby causing the copy board to be moved backwards until the copy board is detected again by means 25.

Reference numerals 27, 28, 29, 36 and 37 denote power transistors that are respectively connected to the motor 21, clutch 23 for the forward movement, clutch 24 for the backward movement, motor 38 for the first feed roller and motor 39 for the second feed roller, respectively.

When recording from electric signals stored in the memory M is required, the print button 40 is depressed so that the microcomputer CON generates a gate signal 34, and the recording can be carried out by an electric-/optical converter means CNV connected with the memory M through a gate 32, the switch SW and amplifire AMP.

It is to be understood that the present invention relates to the control system of the apparatus having the copying function and recording function and is not limited to the construction explained in the above embodiment. For example, the copy board is explained as of moving type in said embodiment. However, an optical system of moving type may be utilized.

As mentioned above, according to the control system of the apparatus for composite-recording information of the present invention, when the apparatus is converted from the operation of copying an original into the operation of recording electric information, the return motion of the copy board is omitted, enabling the stand-by period for recording the electric information to be shortened and, eventually, the time for continuously recording electric information to be reduced.

What is claimed is:

1. In an apparatus for composite-recording information comprising a copy board, a photosensitive member, an optical system operable in a copying mode for forming an image corresponding to an original placed on the copy board onto the photosensitive member thereby to form an electrostatic latent image of the original, reproducing device operable in a recording mode for scanning and reproducing electric information signals on the photosensitive member in the form of an electrostatic latent image, and a developing device for developing the electrostatic latent image on the photosensitive member in a visualized form, a control system for controlling the apparatus for composite-recording information, said control system comprising means for providing a command signal and a computer responsive to said command signal, said computer being responsive to a command signal indicative of a request for recording electric information signals while the electrostatic latent image is being formed on the photosensitive member by means of the optical system, for forming an electrostatic latent image of electric information signals after one page of electrostatic latent image has been formed, said computer including discrimination means whereby when a command signal of recording is introduced to said computer, (a) discrimination is carried out in regard to whether the command signal is to effect copying of the original or recording of first electric information signals, (b) when it is so discriminated that the command signal is to copy the original, the electrostatic latent image of one page of the original is formed on the photosensitive member and is transferred onto a recording paper according to a copying cycle, (c) when it is so discriminated that the command signal is to record the electric information signals, the electrostatic latent image of one page of the electric information signals is formed on the photosensitive member and is transferred onto the recording paper according to a recording cycle, (d) and after one page of the electrostatic latent image has been formed on the photosensitive member, the discrimination is effected as to whether there is a request for recording the second electric information signals, (e) wherein when it is so discriminated that there is a request for such recording, the procedure is returned to the recording cycle to record the second electric information signals, (f) and when it is so discriminated that there is no request for such recording, the discrimination is then carried out in regard to whether the continuous copying operation should be carried out or not, (g) and when it is so discriminated that the continuous copying operation should be carried out, the procedure is returned to the copying cycle to carry out the copying operation.

2. A control system according to claim 1, wherein in carrying out the recording of the electric information, at least a portion of the return time of the optical system is omitted to effect the recording.

* * * * *